United States Patent [19]
Aybay

[11] Patent Number: 5,603,037
[45] Date of Patent: Feb. 11, 1997

[54] CLOCK DISABLE CIRCUIT FOR TRANSLATION BUFFER

[75] Inventor: Husnu G. Aybay, Santa Clara, Calif.

[73] Assignee: Intel Corporation, Santa Clara, Calif.

[21] Appl. No.: 52,952

[22] Filed: Apr. 23, 1993

[51] Int. Cl.$^6$ ........................................... G06F 13/00
[52] U.S. Cl. ........................................... 395/750
[58] Field of Search ............................... 395/750

[56] References Cited

U.S. PATENT DOCUMENTS

| | | | |
|---|---|---|---|
| 5,167,024 | 11/1992 | Smith et al. | 395/375 |
| 5,220,672 | 6/1993 | Nakao et al. | 395/750 |
| 5,233,696 | 8/1993 | Suzuki | 395/375 |
| 5,237,671 | 8/1993 | Freitas et al. | 395/425 |
| 5,255,379 | 10/1993 | Melo | 395/400 |
| 5,392,437 | 2/1995 | Matter et al. | 395/750 |

*Primary Examiner*—Jack B. Harvey
*Assistant Examiner*—John Travis
*Attorney, Agent, or Firm*—Blakely, Sokoloff, Taylor & Zafman

[57] ABSTRACT

A system for power management within a microprocessor by selectively interrupting clock drivers to a Translation Lookaside Buffer (TLB) unit. The present invention interrupts the clock supply to the TLB unit when the TLB unit is disabled by the microprocessor and during periods of time when it is not anticipated that the TLB unit will be accessed. The present invention monitors a page disable bit to indicate when paging is not required within the microprocessor. Further, the present invention monitors instructions within an instruction queue to determine which may utilize the TLB unit for address translation operations. By interrupting the clock supply, the TLB unit (composed of BiCMOS or CMOS circuits) will not consume power when the unit is not needed. The present invention also includes a mechanism for detecting when the TLB unit is to be used and for powering up the unit. The present invention also includes circuitry for preventing the TLB unit from powering down when the TLB unit is busy. The present invention is particularly useful within portable computer systems (i.e., laptop and pen-based systems) where power conservation is a premium concern.

21 Claims, 7 Drawing Sheets

CLOCK DISABLE CIRCUIT FOR TRANSLATION BUFFER

BACKGROUND OF THE INVENTION (1) Field of the Invention

The present invention relates to the field of power consumption control within an electronic device. More specifically the present invention relates to a method and apparatus for power control within a microprocessor architecture.

(2) Prior Art

With the emergence of the portable computer market (such as laptop, hand-held and pen-based computer systems), there is a desire and strong need for a new personal computer that operates at a very low power consumption. Although recently the personal computer market has been attempting to move to power supply voltages of 3 volts, instead of 5 volts, a substantial focus of reducing power consumption within a computer system concentrates on reducing power consumption to chips and component blocks that are in a state of little or no activity. Ideally, when a chip or component is not currently active or when it is anticipated that such chip or component will not be used in the near future, it would be beneficial to reduce its power consumption, and thereby operate the electronics at a lower power consumption rate than when the chip is constantly drawing power. One method of achieving low power consumption in electron devices ("chips") is to employ power management circuits. Power management circuits put the chip or component into a state that draws little or no current, even though the supply voltage remains coupled to the chip. This state is known as a power down state. Power management circuits are particularly advantageous to utilize when a chip is not currently active or during temporary periods when it is anticipated that a chip or chip component will not be needed.

One type of prior art power management circuit utilizes external counters to detect activity in the chip. These counters are usually timers keyed to the last access of the chip. These timers, sometimes called "watchdog" timers, act as retriggerable one-shots, such that when no chip activity occurs for a predetermined period of time, the chip is allowed to power down. One problem with such a power management scheme is that external control of the power management circuit (i.e., via the counter) is required. When external counters signal that the chip may be put into the powered down state, or mode, an external switch turns off the power. Hence, actually entering the power down mode is externally controlled. Furthermore, these power management circuits are not transparent to software controlling the chip. Also, these power management circuits, including the extra timer function, may become rather complex and consume extra power themselves. It would be advantageous to provide a power consumption system that was not overly complex and also transparent to a user. The present invention provides such results.

Another method of powering down circuit components is to use external chip circuitry, i.e., circuitry outside the chip. In order to put a chip into the power down mode using external circuitry, the clocks must be stopped. In order to stop the clocks or at least gate a clock, a bus cycle must be launched or a process must be physically executed at the bus cycle level. The absence of any bus cycles being executed (e.g., through default) is an indication that the device can be shut off. Once a bus cycle did occur to a device that was powered off, a mechanism is required for the clock to start. Also, the device would require a means of recovering fast enough to respond to the cycle. Alternatively, if an access to the powered down device occurred, the processor might have to execute an instruction twice so that a powered down device would have time to respond. Although these prior art mechanisms may provide a viable alternative design, they are very complicated.

Portable computer systems place a high premium on reducing power consumption. The primary mechanism to reduce the active power consumption is to reduce the number of transitions of internal logic, essentially dividing or stopping the clock. This is the case because in modern computer electronic design, power is consumed when logic gates change state and charge is passed from Vcc to Vss. Stop the clock transition within a circuit component and the logic gates of that component will cease changing states. On some computer chips, such as a microprocessor chip, there are numerous functional units and buffers. Each functional unit and buffer unit is responsible for performing a different function. At any given time, some of the functional units may be idle and not performing their designated functions, while others are performing their functions. Unnecessary clocking of unused functional units and buffer units of a processor may contribute to excessive power consumption. For instance, in a processor having a separate floating point unit, when the floating point unit is not executing any floating point instructions, the clocking to the floating point unit causes power to continue to be consumed. It would be beneficial to provide a power consumption system that could selectively disable a functional unit of a microprocessor. The present invention provides such capability.

One functional unit within a microprocessor is the Translation Lookaside Buffer (TLB) unit which is a part of the paging unit of the microprocessor. The TLB performs translation of memory addresses within the microprocessor for various remapping of program and data code executed by the microprocessor. Within the x86 architecture (such as 80286, 80386, and 80486 microprocessors) and DOS applications the TLB may not be required. Further, not all instructions require use of the TLB to perform address translations. This could be the case because some instructions do not require memory accessing at all. However, in prior art system designs, whether or not the TLB is disabled or needed, the TLB unit continues to operate to generate translation information. When the unit is disabled or not needed, this information generated by the TLB unit is simply ignored by the microprocessor. It would be beneficial, then, to provide a system to temporarily disable the actual operation of the Translation Lookaside Buffer unit when such unit is disabled or when instructions do not require address translation by the TLB. Powering down of the TLB would then help to reduce the overall power consumption of the microprocessor. The present invention offers such advantageous capability. Further, it would be beneficial to provide a system that powers up the TLB unit when it is desired for use. The present invention provides such functionality.

Accordingly, it is an object of the present invention to provide a mechanism that allows on-chip functional units to be automatically stopped when not being used and automatically restarted when it is detected that use is anticipated. It is a further object of the present invention to provide a power management system operating within a microprocessor for powering down a Translation Lookaside Buffer unit when the TLB unit is disabled or not needed. It is further an object of the present invention to provide a system to provide power to the TLB unit when the TLB unit is not

3 disabled and when it is anticipated that the TLB unit will be used. It is further an object of the present invention to power down and power up the TLB unit of the microprocessor by selectively interrupting the clock supply signal to the TLB unit. These and other objects of the present invention will become clear upon review of the discussions of the preferred embodiment of the present invention to follow.

SUMMARY OF THE INVENTION

Embodiments of the present invention include a system for power management within a microprocessor by selectively interrupting clock drivers to a Translation Lookaside Buffer (TLB) unit. The present invention interrupts the clock supply to the TLB unit when the TLB unit is disabled by the microprocessor and during periods of time when it is not anticipated that the TLB unit will be accessed. The present invention monitors a page disable bit to indicate when paging is not required within the microprocessor. Further, the present invention monitors instructions within an instruction queue and an instruction decoder unit to determine which may utilize the TLB unit for address translation operations. By interrupting the clock supply, the TLB unit will not consume power when the unit is not needed. The present invention also includes mechanism for detecting when the TLB unit is to be used and for powering up the unit. The present invention also includes circuitry for preventing the TLB unit from powering down when the TLB unit is busy. The present invention is particularly useful within portable computer systems (i.e., laptop and pen-based systems) where power conservation is key.

A mechanism and method for powering down a functional unit on an integrated circuit is described. The integrated circuit has multiple functional units. Each of the functional units is clocked by its own independent clock. The mechanism and method includes providing the functional unit with the information regarding whether the functional unit is required for use. The present invention also includes a mechanism for powering down the functional unit transparently to, and independently of, the remainder of the functional units on the chip when the functional unit is not required for use. In this instance, the independent clock of the functional unit is stopped when the functional unit is not in use and automatically started when the functional unit is required for use.

In the currently preferred embodiment, the Translation Lookaside Buffer (TLB) unit of the microprocessor is the functional unit stopped when paging is not currently enabled within the microprocessor or when it is not anticipated that the TLB unit will be utilized. Whether the Transition Lookaside Buffer (TLB) unit is going to be utilized is determined by advanced information from the instruction decoder unit (and instruction queue) of the microprocessor. Specifically, embodiments of the present invention relate to an apparatus for conserving power by selectively enabling and disabling clocking signals to a memory address translation means, the apparatus comprising: means for indicating whether paging mode is enabled within a microprocessor means; means for generating a disable signal when the paging mode is not enabled, the means for generating responsive to the means for indicating; means for supplying clock signals to the memory address translation means, the means for supplying clock signals coupled to the memory address translation means; and means for selectively gating the clock signals off when the disable signal is generated, the means for selectively gating the clock signals coupled to the means for supplying clock signals. An embodiment of the present invention includes the above wherein the memory address translation means is a translation lookaside buffer (TLB) unit. A further embodiment of the present invention includes the above wherein the means for selectively gating the clock signals also comprises means for gating the clock signals on when the disable signal is not generated.

Alternative embodiments of the present invention relate to an apparatus for conserving power by selectively enabling and disabling clocking signals to a memory address translation means, the apparatus comprising: means for indicating whether paging mode is enabled within a microprocessor means; means for generating an instruction signal indicating that no instructions within an instruction decoder of the microprocessor means require an external memory access; means for generating a disable signal when the paging mode is not enabled or when the paging mode is enabled and the instruction signal is generated, the means for generating a disable signal responsive to the means for indicating whether paging mode is enabled and responsive to the means for generating an instruction signal; and means for selectively gating clock signals off when the disable signal is generated and for gating the clock signals on when the disable signal is not generated, the clock signals supplied to the memory address translation means. Embodiments of the present invention include the above wherein the memory address translation means includes a translation lookaside buffer (TLB) unit.

An embodiment of the present invention relates to a method of power conservation within a microprocessor, the method comprising the steps of: indicating whether paging mode is enabled or disabled within the microprocessor; generating a disable signal when the paging mode is not enabled; and selectively gating clock signals off that supply a translation lookaside buffer (TLB) unit when the disable signal is generated; and gating the clock signals on that supply a translation lookaside buffer (TLB) unit when the disable signal is not generated.

DETAILED DESCRIPTION OF INVENTION

The present invention is employed in conjunction with an on-chip functional unit (the Translation Lookaside Buffer unit). A functional unit is a portion of an integrated circuit which has a designated function. Examples of functional units are the TLB unit of the present invention as well as an integer and floating point instruction execution units, instruction decoders, etc. Aspects of the present invention may also be applicable to additional on-chip core logic, such as bus controllers and memory controllers, as well as other logic which is integrated on the same die.

The present invention allows the TLB unit to be powered down when not required for use or when disabled. The TLB unit will not be required for use when it is not currently busy and is not going to be needed in the near future (i.e., when it is not preparing for an imminent use). For example, if an instruction that utilizes an external memory access operation is being decoded or is located on the instruction queue, then barring any intervening halt or interrupt condition for the processor, the use of the TLB unit is imminent. If the TLB unit use is imminent, the unit must prepare to perform its function. Placing of the TLB unit in the power down state is accomplished by starting and stopping of the clocks to the TLB unit. According to the present invention, the clock drivers to the TLB unit are disabled automatically when the TLB unit is disabled or when not needed and automatically restarted during its preparation for use.

The present invention determines when the TLB unit is required for use (i.e., being used or prepared for use) by using internal interfaces. The present invention defines an interface to detect when the TLB unit is idle. In this manner, the present invention provides an internal interface to detect when instructions that may utilize the TLB unit are about to be decoded. This allows the TLB unit to determine when it should prepare for use. In the currently preferred embodiment, this interface comprises a set of signals. The present invention also includes logic blocks to determine when the paging functions within the microprocessor are disabled and will power down the TLB unit when disabled. The present invention also defines an internal interface between the TLB unit and the clock drivers for the TLB unit to control the stopping and restarting of the TLB unit's clock supply. In the current preferred embodiment, this internal interface comprises a signal from a logic unit which enables and disables the clock drivers. The present invention also contains an information feedback loop originating from the TLB unit which indicates when the TLB unit is busy. No power down state will be entered by the present invention until the TLB unit indicates that it is no longer busy.

In the following detailed description of the present invention numerous specific details are set forth in order to provide a thorough understanding of the present invention. However, it will be obvious to one skilled in the art that the present invention may be practiced without these specific details. In other instances well known methods, circuits, apparatus, components, specific logic gates, functional unit types, and signal names, etc. have not been described in detail as not to unnecessarily obscure the present invention.

Overall Computer System of the Present Invention

Figure 1:
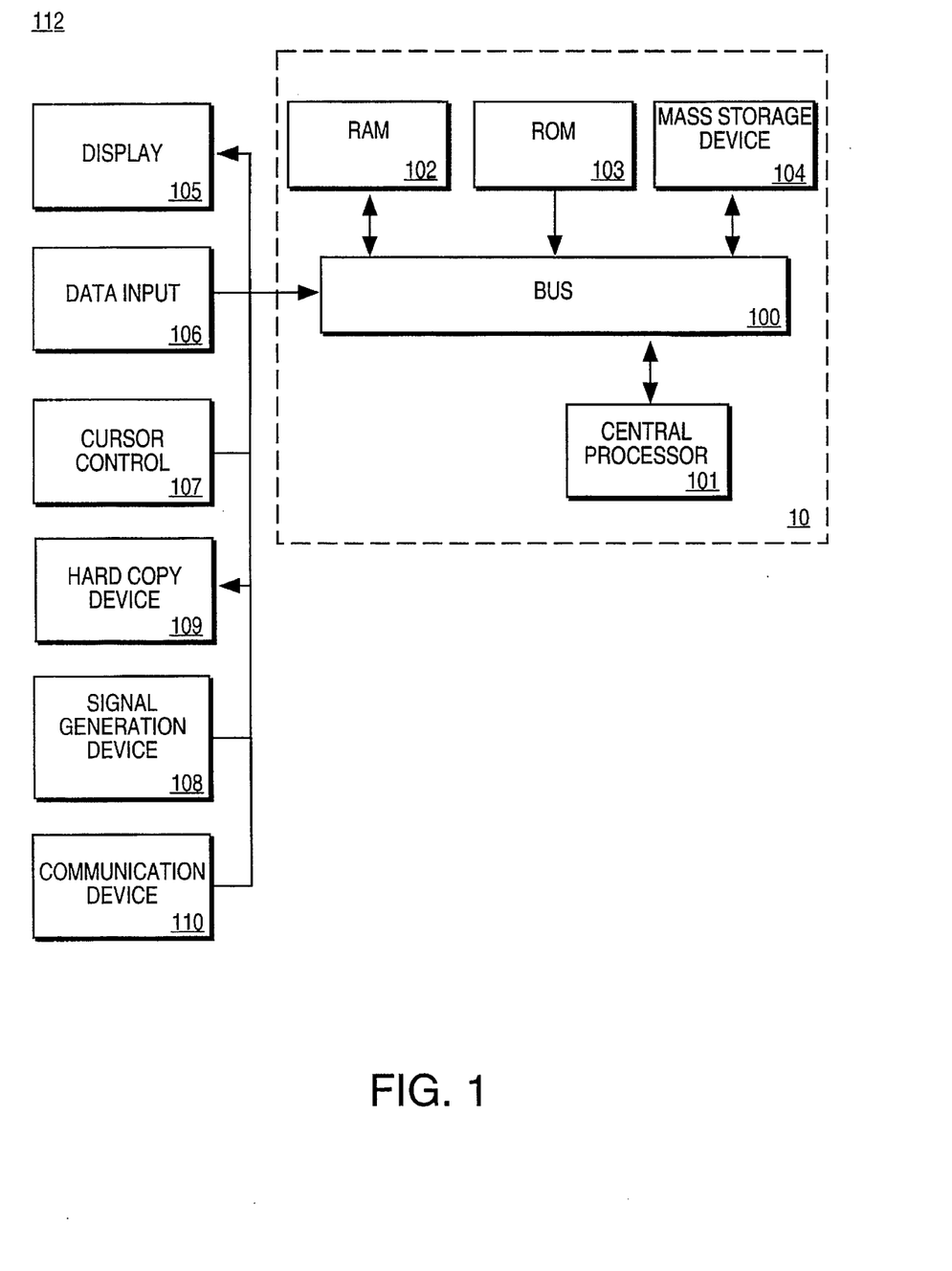
FIG. 1 is an illustration of a computer system of the present invention.

One embodiment of the present invention may be advantageously utilized within a general purpose computer system 112 as illustrated in block diagram format in FIG. 1. It will be understood that while FIG. 1 is useful for providing an overall description of the computer system of the present invention, some details of the system are not shown. Further, the present invention is described with reference to its preferred embodiment; and alternative embodiments, or other embodiments that may be conceived by one of ordinary skill in the art are considered within the scope of the claims set forth below.

Such general purpose computer systems 112 comprise a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic disk or optical disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101 and for communicating data to the data bus 100.

It is appreciated that the RAM 102, ROM 103, storage device 104, bus 100, and central processor 101 may be incorporated into a single unit or chassis 10 comprising a computer unit, also called a CPU unit or "motherboard" as illustrated in FIG. 1. The remainder of the peripheral systems (display 105, data input 106, cursor control 107, hardcopy device 109, signal generation device 108, and communication interface 110) may be coupled with the chassis 10 for creation of the entire computer system 112. It is appreciated that the microprocessor unit 101 of the present invention may be of a pipeline and/or superscalar architecture. The advantageous features of the present invention may operate equally effective within a number of different microprocessor types and architectures.

The display device 105 utilized with the computer system and the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the data input 106 (alphanumeric input device) capable of signaling movement of a given direction or manner of displacement. In the discussions regarding cursor movement and/or activation within the preferred embodiment, it is to be assumed that the input cursor directing device or push button may consist of any of those described above and specifically is not limited to the mouse or cursor device.

Also coupled to the bus 100 (and therefore the processor 101) of the general purpose computer system of the present invention is also a hard copy device 109 capable of generating hard copy output from data generated by the computer system. This hard copy device 109 may include a printer, plotter or other visualization device capable of presenting computer images in a readable, tangible, form. Also coupled to the bus 100 is a communication device 110 for supplying information to the computer system 112 externally. This communication device 110 may be implemented as a parallel or serial input device or other communication interface component, such as a local area network hub or modem port.

It is appreciated that certain implementations and uses of the present invention may not require nor include all of the above components. For example, in certain implementations a keyboard and cursor control device for inputting information to the system may not be required. In other implementations, it may not be required to provide a display device for displaying information.

Microprocessor of the Present Invention

Figure 2:
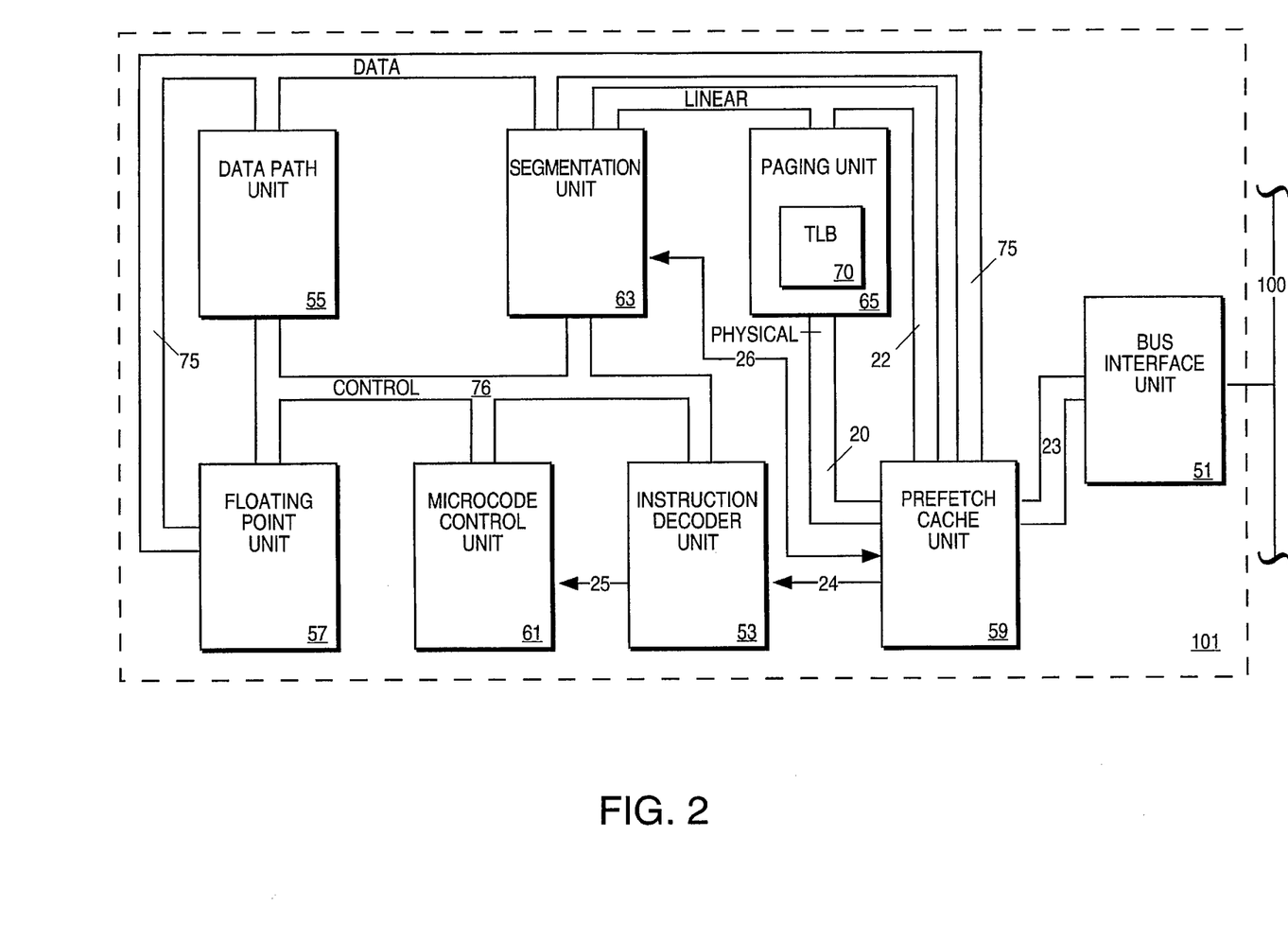
FIG. 2 is a block diagram of a microprocessor of the present invention.

FIG. 2 illustrates a more detailed block diagram of the units of the microprocessor 101 of the computer system 112 as pertinent to the embodiments of the present invention. The central processor 101 contains a bus interface unit (BIU) 51 which couples to the address/data bus 100 of the computer system. The BIU 51 performs the interface between the on-chip units and the remainder of the computer system that is external to the processor chip 101. The B IU 51 couples to a prefetch and cache unit 59. The prefetch unit 59 initiates the instruction and data fetch operations of the microprocessor when executing a program of instructions. Within the prefetch unit 59 are a set of instruction caches and data caches. The prefetch and cache unit 59 is coupled to an instruction decoder unit 53 which receives fetched instructions and begins to decode the instructions in order to route them to appropriate execution units within the microprocessor as well as perform other control operations. The instruction decoder 53 includes an instruction queue that holds a few of the instructions to be executed by the microprocessor. According to the preferred embodiment of the present invention the instruction queue contains two instructions. An instruction stream travels from the prefetch cache unit 59 to the instruction decoder unit 53 via line 24. The instruction decoder unit 53 is coupled to a microcode control unit 61 which generates control for various units. A stream of decoded instructions flows over line 25 between the instruction decoder unit 53 and the microcode unit 61. The microcode control unit 61 receives information from the instruction decoder and performs control functions based on the current instructions.

The microcode unit 61 controls operations within the data path unit 55, the floating point unit 57, the segmentation unit 63 and the instruction decoder unit 53 via control bus 76. The data path unit 55 contains the arithmetic logic unit (ALU), and other operational units (such as barrel shifter, multiplier, adder, etc.), and the internal register files. The data path unit also performs integer arithmetic and logic operations. The segmentation unit 63 performs memory address generation and contains descriptor registers. The segmentation unit 63 generates linear addresses which are fed to the paging unit 65 over the linear address bus 22. Also controlled by the microcode unit 61 is the floating point unit 57. The floating point unit 57 performs the floating point computations that are present within the instructions executed by the microprocessor 101.

Referring still to FIG. 2, the microprocessor 101 also contains a paging unit 65 which contains the Translation Lookaside Buffer unit (TLB unit) 70. The paging unit 65 performs translations of the linear addresses generated by the segmentation unit into physical addresses accessed by the microprocessor. The physical addresses may exist within RAM 102 or ROM 103 off-chip or may be found within the cache memories within the prefetch and cache unit 59. The functions of the TLB unit 70 and the paging unit 65 will be described in more detail to follow. An internal microprocessor bus 75 acts to couple the prefetch unit 59, the segmentation unit 63, the data path unit 55, and the floating point unit 57. This internal bus is a 64-bit interunit transfer bus and contains two 32-bit data buses.

A linear address bus 22 couples the segmentation unit 63, the paging unit 65 and the prefetch and cache unit 59. A physical address bus 20 couples the paging unit 65 to the prefetch and cache unit 59. The bus interface unit 51 is coupled to the prefetch cache unit 59 via bus 23. A displacement bus 26 couples the segment unit 63 with the prefetch cache unit 59. It is appreciated that the above microprocessor architecture is presented for illustrative purposes for the present invention. However, the present invention may advantageously operate within any number of various microprocessor architectures having translation lookaside buffer units or address translation functional units. The present invention should not be viewed as limited or constrained to the specific microprocessor architecture illustrated in FIG. 2. Rather, a number of microprocessor architectures will fall within the spirit and scope of the present invention. Although FIG. 2 is a description of the environment of the preferred embodiment of the present invention, it is appreciated that alternative embodiments of the present invention are equally applicable to CPU architectures not containing segmentation and/or microcode sequencing units.

Paging Within the Microprocessor Architecture

Memory paging is basically a memory address translation process whereby one address is translated into another address in order to allow processing efficiency and effectiveness. In many cases, an input linear memory address is translated into an output physical memory address by the paging unit 65 of the microprocessor 101. In the present invention, the segmentation unit 63 generates linear memory addresses that are sent over the linear address bus 22 to a paging unit 65. The linear addresses are translated into physical memory addresses within the paging unit 65 using a translation lookaside buffer unit 70. The physical memory addresses are then transferred over the physical address bus 20 to a prefetch cache unit and then output to the external bus 100 via the bus interface unit 51. The translation lookaside buffer unit keeps a record of the most recently translated linear addresses and their corresponding physical addresses. Using such a translation listing, if the same linear address is input repeatedly, the TLB can use the previously stored data in the listing to generate the physical address without a time consuming computation to otherwise generate the physical address. In this sense, the TLB 70 acts as sort of a "cache" for the linear address to physical address translation operations. For example, the first time a linear address is introduced to the paging unit 65, a time consuming translation is encountered whereby the physical address is generated. The linear address and physical address are then entered into the translation buffer unit 70. The next time the same linear address is received by the paging unit 65, the buffer will be indexed by the linear address and an output will be generated which is the physical address. It is appreciated that paging is a well known function within modern microprocessors. For this reason detailed discussion of the functions and operations of paging is not required herein. The below is a discussion of relevant paging operations and applications. The present invention may advantageously operate in connection with a variety of different paging units that perform address translation. Therefore, any paging unit performing address translation will be within the spirit and scope of the present invention.

Paging is useful in applications where it is beneficial to relocate memory locations within the computer system memory with reference to their programmed location. In other words, when it is desired to operate two application programs at the same time, their programmed memory locations may conflict with each other within the computer memory. In order to retain both programs in the computer memory 102 at the same time, it is necessary to execute a memory translation on the addresses of at least one of the programs, or for both. This translation is transparent to a computer user and is accomplished in the paging unit 65. Once the paging unit 65 is programmed with the translation configuration parameters (or segment descriptor registers), each time a linear or "virtual" address is encountered by the microprocessor it will be translated into a physical address by the paging unit. The physical address represents the actual present location of the program code or data within the computer system memory 102. The linear or "virtual" address represents the programmed location of the code or data. For instance, assume the original program code for a program1 occupied memory locations 8110H to 9000H. This code is then translated to actual (physical) locations 1110H to 2000H within the memory 102. When the program code for linear address 8110H is encountered by the segmentation unit 63, it will be translated into the physical address 1110H by the paging unit. The paging unit 65 then transfers the physical address to the prefetch unit 59 which generates an external memory access via the bus control unit 51 using the physical address. A second program2 may then occupy the physical memory locations 8110H to 9000H without a memory address conflict since the program1 locations were automatically rerouted to the 1110H to 2000H range by the paging unit 65 and TLB 70 of the microprocessor.

Paging is also useful when a program of very large size, say 20 megabytes is being executed on a computer system having only a limited memory size, say 4 megabytes for instance. The linear addresses will be in the range of 20 megabytes as originally coded by the program. However, the computer system only loads small segments of the program code into the memory 102 at any given time. Therefore, the linear addresses (20 megabyte range) are translated into the physical (or actual) memory locations of the computer memory 102 by the paging unit 65. For example, say the last 4 megabytes of the 20 megabyte program code were currently loaded into the computer memory 102 and this program segment was executing. An external memory address access operation will be generated and a 20 megabyte address location (linear address) will be sent over the linear address bus by the segmentation unit 63. The paging unit 65 will translate this long 20 megabyte address location into a smaller 4 megabyte address range (physical address). This translation will involve removing the most significant bits of the 20 megabyte address while retaining the least significant bits of the 20 megabyte address. This translated address will then be sent over the physical address bus to the prefetch unit 59 and the required data or instruction code will be obtained over the bus interface unit 51.

There are many circumstances when paging is advantageous and is used generously by the microprocessor 101 to increase speed and efficiency. However, there are also instances when the paging feature is not required and therefore may be disabled by the programmer or the microprocessor. When the paging feature is disabled, the TLB 70 within the paging unit 65 will still act to translate linear addresses into physical addresses. However, the results of the paging unit 65 and TLB buffer unit 70 will be simply ignored by the processing logic of the microprocessor and the linear address, will simply be sent unchanged over the physical address data bus for memory access operations. When paging mode is not enabled, the TLB unit 70 will therefore consume power by performing address translations that are not required and not used. This power and address translation effort is effectively wasted within the microprocessor. In these cases, the present invention acts to disable the clocking signals that supply the translation lookaside buffer (TLB) unit in order to conserve power consumption. Since the microprocessor of the present invention is constructed from BiCMOS transistor logic, by temporarily interrupting the clock signal, effectively no power will be consumed by the TLB unit 70.

There are two major cases when address translation is not required and the output of the TLB 70 is not needed. The first case was described above and exists when the paging mode of the microprocessor is not enabled. The paging mode is disabled usually when the microprocessor 101 is emulating a microprocessor architecture that does not support paging mode capability, such as the 8086 microprocessor and microprocessors executing a variety of DOS applications. In these cases, no paging modes are supported, so the feature is disabled by the programmer by setting or resetting a control register. The microprocessor 101 provides several 32-bit control word registers that allow the microprocessor to be configured in a variety of ways. One control word register, CR0, has a paging enable bit (bit 31) that enables or disables the paging unit 65 and TLB 70 unit. If the paging enable bit 31 is set to 1, the paging unit 65 is enabled and if reset to 0 the paging unit 65 is disabled. It is appreciated that if the bit 31 is reset (=0) although disabled, the TLB unit 70 operates and consumes power, but its results are ignored. The other case in which the TLB unit 70 can be powered down is when the currently executed and decoded instructions do not contain an external memory access operation. If no external memory accesses are required, there will be no required linear to physical address translations. In this case, the paging unit 65 and TLB unit 70 can be powered down until the case in which it is determined that an instruction is being decoded (by the instruction decoder unit 53) that utilizes an external memory access. It is appreciated that external memory access is required to access a memory location external to the microprocessor 101 (such as memory 102).

Given the above, embodiments of the present invention include circuitry to temporarily not enable the clocking signals to the TLB unit 70 when: (1) paging is disabled according to the enable bit 31 (i.e., CR_bit31 =0); and (2) when it is determined that no instructions within the instruction decoder 53 (and associated instruction queue) require an external memory access operation and paging mode is enabled. The present invention also includes circuitry to restore the clocking signals to the TLB unit 70 when: (1) the paging unit is enabled; and (2) when it is determined that the instruction decoder unit 53 or the instruction queue contains an instruction that requires an external memory access operation and paging mode is enabled. It should be noted that not every external memory access cycle requires an address translation. However, the present invention utilizes external memory accessing as a indication of the need for address translation in order to provide a system that is not overly complex to implement and yet will ensure that the TLB unit 70 will be powered up and ready for each and every instruction that will require a memory address translation operation.

Figure 3:
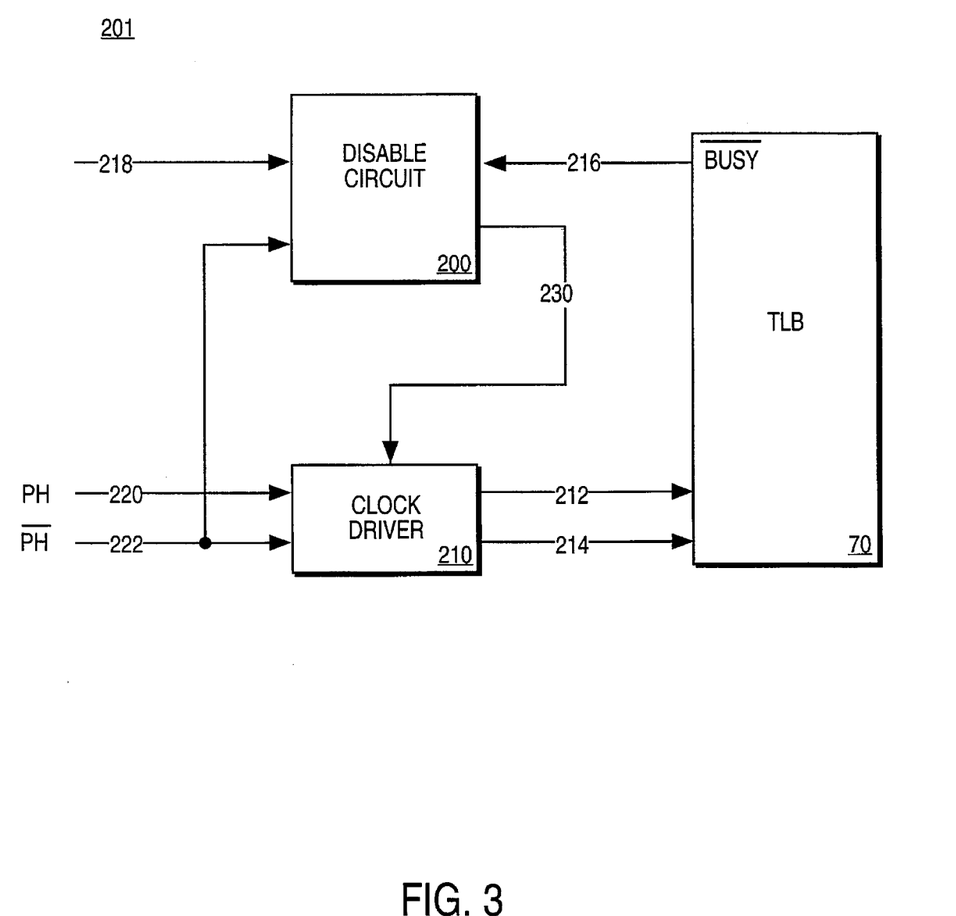
FIG. 3 is a block diagram illustration of the logic of the preferred embodiment of the present invention for selectively interrupting clocking signals to the Translation Lookaside Buffer unit.

The major logical blocks of the preferred embodiment of the present invention are illustrated in FIG. 3. The circuitry 201 of the present invention is composed of disable circuit block 200 and clock driver block 210 which interface with the TLB unit 70. The input line 218 carries the status of the page enable bit 31 of the control word (CR0) that indicates the selected paging mode (i.e., disable/enable) of the microprocessor. This bit signal will be referred to as CR_bit31 or the paging enable bit. This bit is fed to the disable circuit 200 as well as a busy# signal 216 (herein # indicates low assertion) that is asserted low and originates from the TLB unit 70. This signal 216 is asserted low and will remain low while the TLB unit is currently processing a previously initialized address translation and is thus "busy". When the TLB unit is idle and not performing an address translation, this bit will be set to a high condition. Also input to the disable circuit 200 is an inverted clock phase (PH#) from line 222. The clock signals 220 and 222 supply the clocking for the page unit 65. The disable circuit 200 generates a PD (page disable) signal over line 230 that is used by the preferred embodiment of the present invention to temporarily interrupt the clocking signals to the TLB unit 70 when asserted. The PD signal 230 is coupled to the clock driver circuit 210.

Referring still to FIG. 3, there is illustrated a clock driver block 210. Two clocking signals 220 and 222 are fed into the clock driver block 210. Signal 222, PH#, is the inverse of signal 220, PH. These are the system clocks used by the microprocessor 101 to clock various functional units including the translation lookaside buffer (TLB) 70 and paging unit 65. Also fed to the clock driver 210 is the PD signal 230 from the disable circuit 200. Two signals 212 and 214 are fed from the clock driver circuit 210 to the TLB unit 70 in order to supply clocking phases to the TLB circuit 70 that may be gated on or off. Line 212 carries the TLBPH signal which when gated on follows the PH signal and line 214 carries the TLBPH# signal which is the inverse of the TLBPH signal and when gated on follows the PH# signal. The clock driver circuit 210 performs two basic functions within the present invention. First, it provides a driver function in order to supply the TLB unit 70 with adequate clocking signals and also provides a gating function to gate the input clock phase signals 220 and 222 to output signals 212 and 214. According to the operation of the present invention, when the CR_bit31 goes low (paging disabled) and the busy# signal is not asserted (i.e., it is high), then the PD signal will go high and the clocking inputs 220 and 222 will be gated off. In this case the output signals 212 and 214 will be disabled and the TLB unit 70 will not receive a clocking phase. Line 212 will remain low and line 214 remains high. Because the TLB unit 70 contains BiCMOS and/or CMOS circuits, power consumption will decrease substantially, if not completely, when the PD signal is asserted.

Figure 4A:
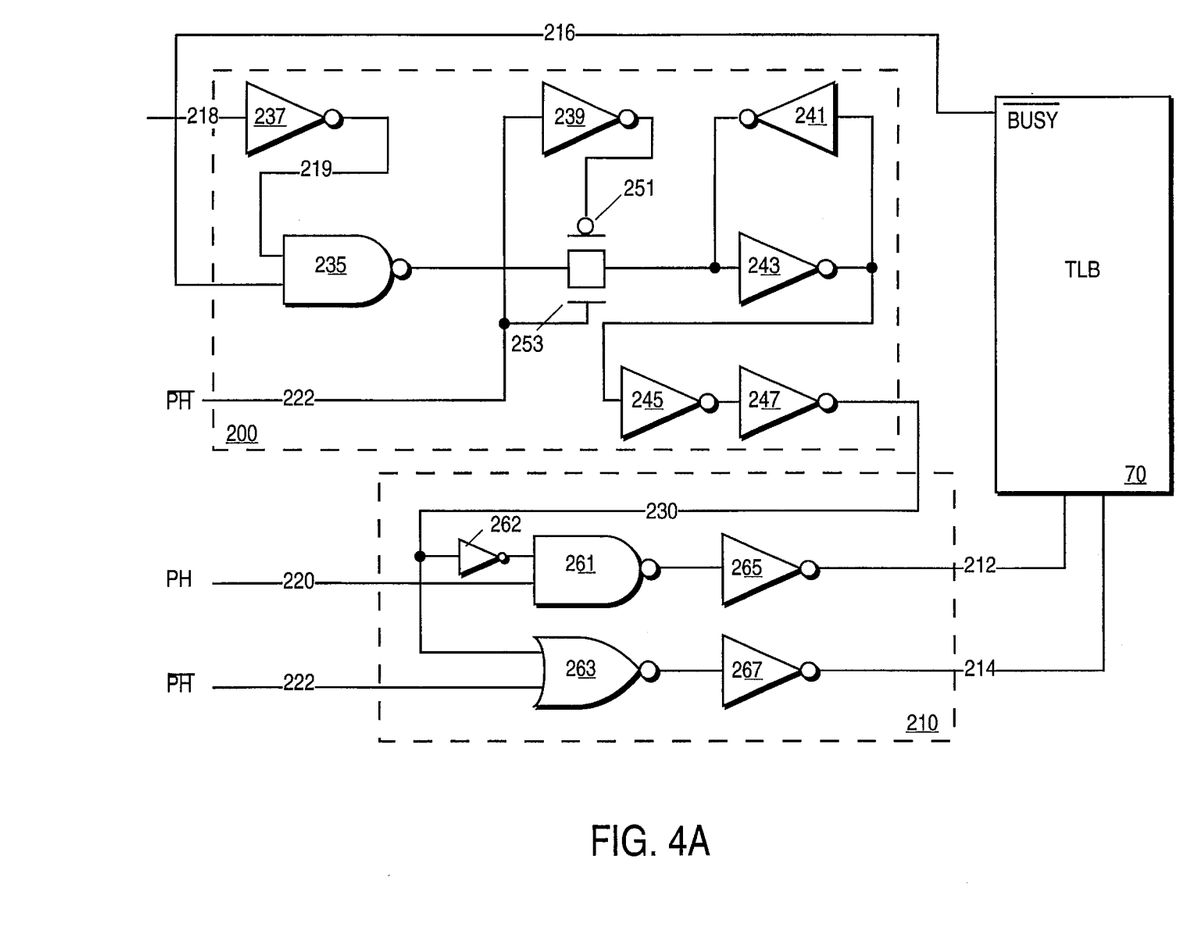
FIG. 4a is a detailed circuit diagram of the preferred embodiment of the present invention.

Refer now to FIG. 4a which illustrates the details of the disable circuit block 200 and the clock driver block 210 of the preferred embodiment of the present invention. It is appreciated that blocks 200 and 210 are located within the microprocessor 101 of the present invention. The disable circuit block 200 will first be discussed. The paging enable bit, CR_bit31, from the control register, CR0, is fed via line 218 to an inverter 237 and the output of the inverter 237 is fed to the input of an NAND gate 235 via line 219. Line 219 is the inverted paging enable signal. The paging enable bit (line 218) is inverted in order to provide a paging mode disable signal from the control register CR0. The busy# signal 216 that is low when the TLB is currently processing an address translation operation and is high when the TLB is at idle, is fed into the other input of the NAND gate 235. The output of NAND gate 235 is the current disable status for the TLB 70. The output of the NAND gate 235 is fed to a pass gate configuration having a p-type transistor 251 and a n-type transistor 253. The gate of the p-type transistor 251 is coupled to the output of an inverter 239 and the input to the inverter 239 is coupled to the gate of the n-type transistor 253. Input from line 222 is coupled to the gate of the n-type transistor 253 and the input of inverter 239.

Input over line 222 carries the signal of the inverted phase of the clocking signal. Therefore, the pass gate configuration of transistors 251 and 253 allows the disable status signal from the output of the NAND gate 235 to pass through when the signal over line 222 is high. The signal from the NAND gate 235 passes through the pass gate configuration 251 and 253 to a latch circuit. The latch circuit is composed of two inverters 241 and 243. Inverter 243 receives the input signal from the pass gate (i.e., NAND gate 235) and sends an output to the input of inverter 241. The output of inverter 241 is coupled to the input of inverter 243 in order to latch in the current disable status signal. The input will be latched in until a new disable status signal arrives from the pass gate configuration. The output of the latch circuit is sent through two inverters 245 first, then inverter 247 and then exits block 200. The output of the circuit block 200 is the output from the second inverter 247 and is the page disable power off signal (PD signal). This signal is fed to the clock driver and gating block 210. It is appreciated that the signal over line 222 is used to gate the output of the NAND gate 235 so that the paging disable power off signal PD over line 230 is asserted to the clock driver and gating block 210 at a known point with respect to the clocking signals. This is required because the clocking signals fed to the TLB unit 70 must be gated (started and stopped) at known states within the transition periods of the clocking signals. According to the present invention, the PD signal 230 transitions from low to high (asserts) when the PH# signal (line 222) transitions from low to high and the PD signal 230 transitions from high to low (deasserts) also when the PH# signal (line 222) transitions from low to high.

The clock driver and gating block 210 receives clocking signals PH and PH# (inverse) over lines 220 and 222 respectively. These are the phase clocking signals that provide timing and execution synchronization to the Translation Lookaside Buffer (TLB) unit 70 as well as other functional units of the microprocessor. Line 220 is fed to an input of NAND gate 261 and the PD signal over line 230 is fed from the block 200 to block 210 into the input of inverter 262 and the output of inverter 262 is fed into the other input of NAND gate 261. The output of the NAND gate 261 is fed to inverter 265 and this output is fed over line 212 as signal TLBPH to supply the TLB unit 70. The clock signal over line 222 is fed to an input of NOR gate 263. The other input of the NOR gate 263 receives an input from the PD signal from line 230. The output of the NOR gate 263 is fed to an inverter 267 and this inverter 267 outputs a signal TLBPH# over line 214 which is the inverse of signal TLBPH of line 212. Both signals 212 and 214 are then fed to the TLB unit 70.

In operation, the preferred embodiment of the present invention acts to gate the clocking signals 220 and 222 when the PD signal is asserted high so that the clock signals 212 and 214 act to power down the TLB unit 70 during these periods. When the busy# signal is high, the TLB unit 70 is idle and the NAND gate 235 will allow the inverted paging enable bit 219 (CR_bit31#) to reach the input of the pass gate network 251, 253. The output of the NAND gate 235 will only be low when the busy# signal is high and the CR_bit31# (line 219) is high. At all other times the output of the NAND gate 235 is high. When NAND gate 235 outputs a low signal, this corresponds to the TLB unit 70 being idle and the paging disabled from the control register; only this configuration causes the PD signal 230 to go high. Use of the busy# signal is accomplished because the microprocessor may enter a paging disable state following a period when the paging features were previously enabled and utilized and thus the TLB unit 70 will be busy performing a valid and needed translation. When the inverted paging enable line 219 goes high for the first time, the TLB unit 70 may be currently processing a prior address translation that is required by the microprocessor and the busy# will be low. In this case, it is not advantageous to cut the clocking pulses to the TLB unit 70 because the microprocessor requires the data generated by the TLB unit 70. When the busy# signal 216 is low, the output of NAND gate 235 will always be high. The present invention therefore offers a mechanism to temporarily ignore the status of the inverted paging enable bit 219 until the TLB unit 70 finishes processing its current task. Once the TLB unit 70 finishes its current task, it will generate a high signal over the busy# line 216 and this will allow the circuit block 200 to recognize the signal over the inverted paging enable signal of line 219.

When busy# 216 is high, meaning the TLB unit 70 is idle, and line 219 is high (i.e., paging is disabled), the low signal from the NAND gate 235 will be passed to the latch network when line 222 goes high. This status is latched until the inverted paging enable bit 219 goes low again and the line 222 goes high. Note that the busy# line remains high once the clocking signals 212 and 214 to the TLB unit 70 are interrupted. When the PD signal is active over line 230, it is inverted and fed into logic that realizes the AND function (gate 261 and 265). Once inverted, the PD signal will not allow the signal PH over line 220 to pass through to line 212 and line 212 TLBPH will remain in a low state. When the PD signal is active over line 230 the NOR function (realized by NOR gate 263 and inverter 267) will force the signal over line 214 TLBPH# to remain high. The above states for lines 212 and 214 will remain stable until the PD signal 230 goes low. In the above state (TLBPH low and stable; TLBPH# high and stable) the TLB unit 70 is in a power down mode.

By stopping clock transitions over line 212 and 214 which feed the TLB unit 70 during periods when the paging enable CR_bit31 signal (line 218) is low (i.e., when the inverted paging enable bit at line 219 is high), the present invention causes the TLB unit 70 to conserve power by reducing power consumption. When the paging enable bit CR_bit31 (line 218) is low the results generated by the TLB unit 70 are not needed by the microprocessor 101 and therefore the present invention provides a system and method for powering down the TLB unit 70 during these periods. Also, the present invention allows the TLB unit 70 to finish processing prior tasks before entering a power down mode. When the page enable signal 218 is set high (i.e., paging enabled), the inverted signal 219 is reset low, and the latch circuit (241, 243) will be reset when the signal at line 222 goes high. This will cause the PD signal over line 230 to go low and the gating and driving circuits of block 210 will allow the clocking signals from 220 and 222 to once again pass to the TLB unit 70 over lines 212 and 214 respectively. Therefore, the preferred embodiment of the present invention allows a mechanism to restore the clocking signals to the TLB unit 70 when the paging enable bit 218 is set (i.e., set to 1).

Figure 4B:
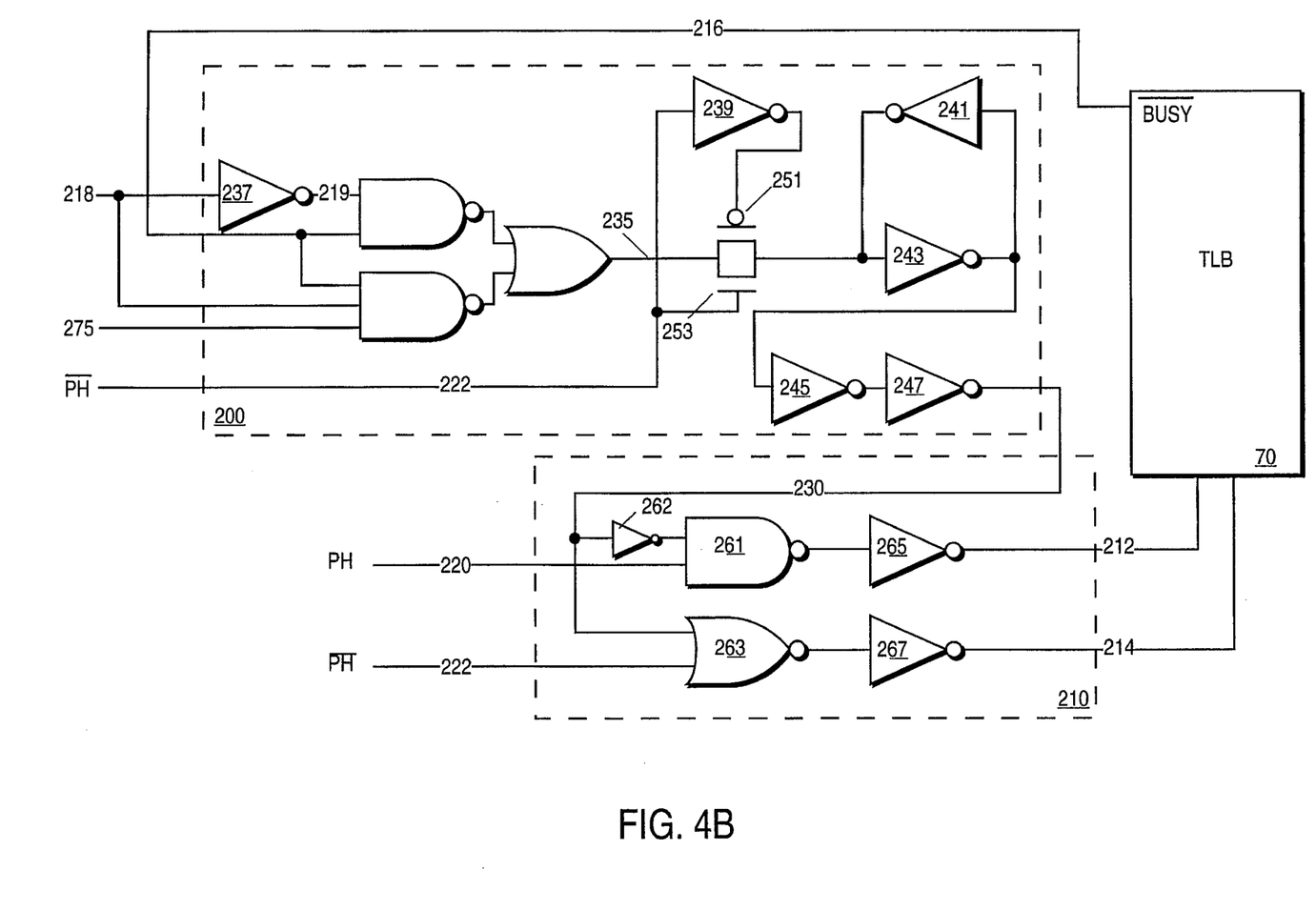
FIG. 4b is a detailed circuit diagram of an alternate embodiment of the present invention.
Figure 6:
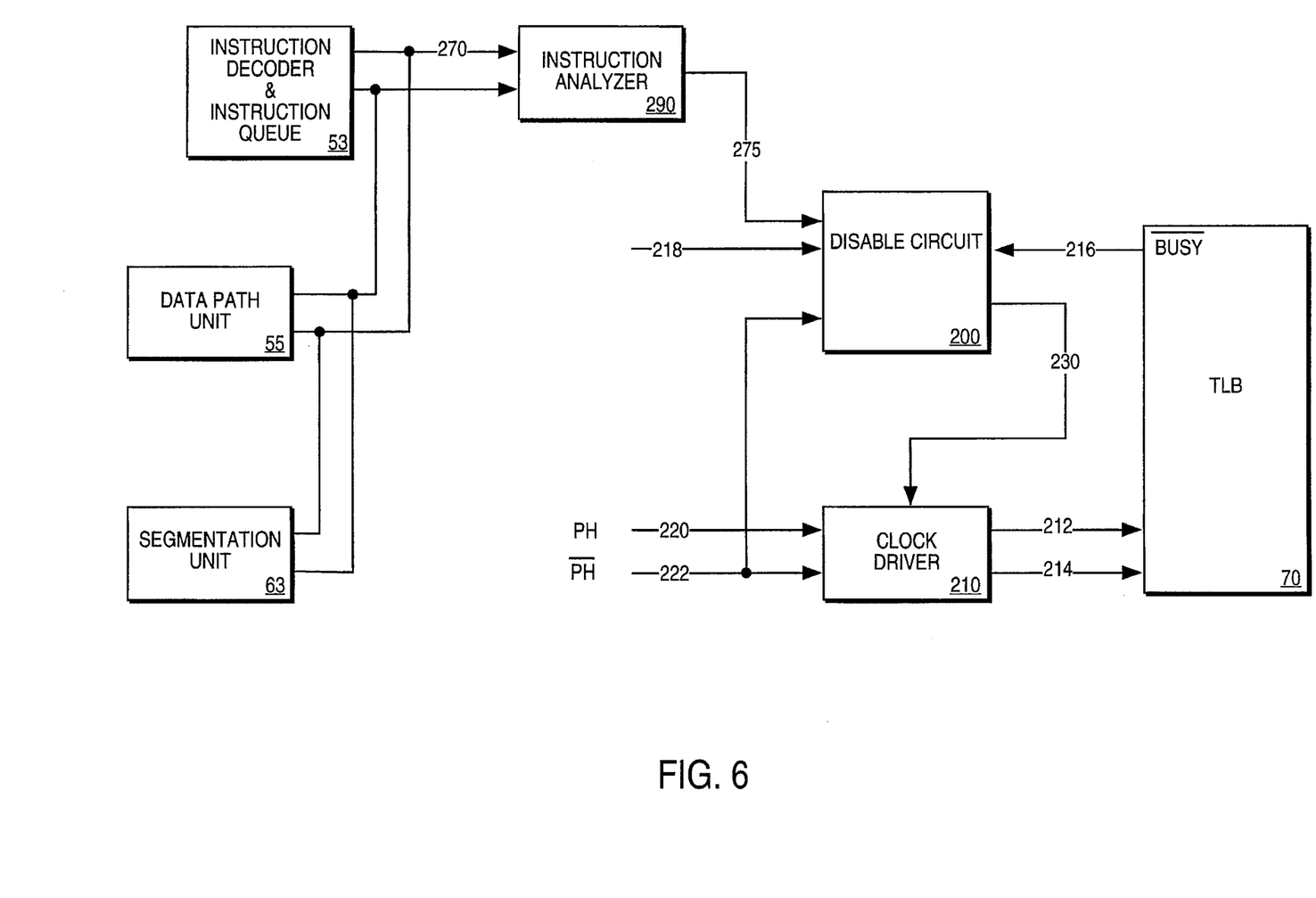
FIG. 6 is a block diagram illustration of the logic of an alternative embodiment of the present invention.

FIG. 4b illustrates an alternate embodiment of the circuit of FIG. 4a, wherein disable circuit 200 also responds to instruction signal 275 from instruction analyzer 290 of FIG. 6. When instruction signal 275 is active it indicates that no instructions decoded by instruction decoder 53 of FIG. 6 or within the instruction queue require an external memory access. If instruction signal 275 is active and the paging bit over line 218 is active, circuit 200 will disable the clocks to the TLB.

Figure 5:
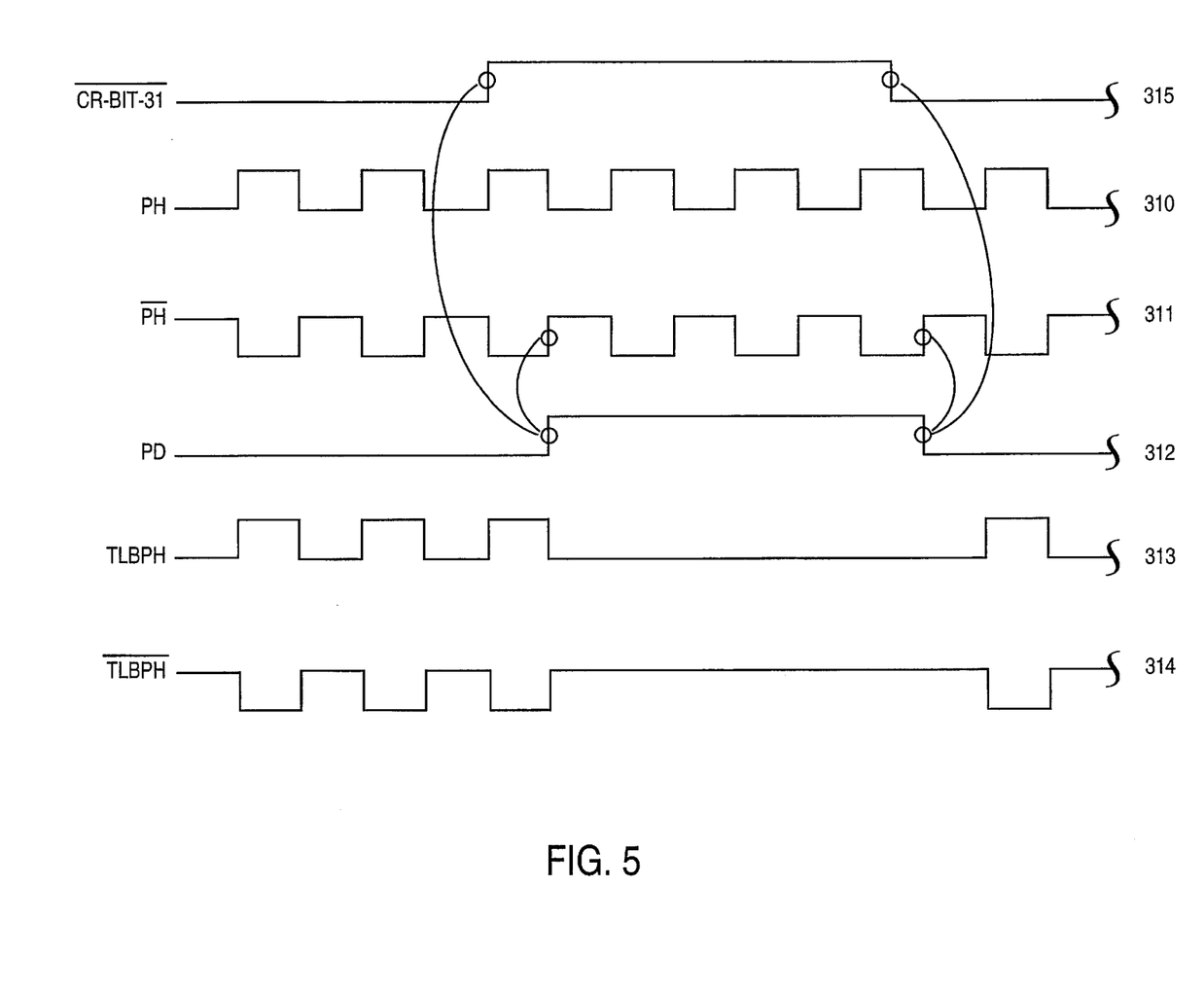
FIG. 5 is a timing diagram illustrating the state transitions of clocking signals and the page disable signal of the preferred embodiment of the present invention.

FIG. 5 illustrates a timing diagram of signals of the preferred embodiment of the present invention. The timing diagram of FIG. 5 assumes the busy# signal over line 216 is high so that the TLB unit 70 is idle. The microprocessor clocking signal 310 (from line 220) and signal 311 (from line 222) are illustrated as PH and PH# respectively. The inverse signal (over line 219) of the paging enable signal from the control register is illustrated by signal 315. This signal is also called the CR_bit31# signal. The paging disable signal PD (from line 230) generated from the disable circuit 200 is illustrated as signal 312. As shown from the event arrows, the PD signal 312 goes high when the PH# signal 311 goes high and the CR_bit31# signal 315 is high. The PD signal 312 goes low when the CR_bit31# signal 315 goes low and the PH# signal 311 goes high. It is appreciated that when the busy# signal over line 216 goes low, the inverted page enable signal 315 is effectively ignored by the present invention.

The gated clocking signals supplied to the TLB unit 70 over lines 212 and 214 are illustrated as signal 313 (TLBPH) and 314 (TLBPH#) respectively. As illustrated in FIG. 5, the signal at line 313 is simply the same clocking signal as at line 310 when PD 312 is low. However, when the PD signal 312 goes high, the signal at line 313 goes low and remains low while PD 312 is high. When PD 312 is reset low again, the signal at 313 again emulates the signal at line 310. The signal at line 314 is simply the same clocking signal as at line 311 when PD 312 is low. However, when the PD signal 312 goes high, the signal at line 314 goes high and remains high while PD 312 is high. When PD 312 is reset low again, the signal at 314 again emulates the signal at line 311 and power is restored. During those timing periods when the signal 313 is low and stable and the signal 314 is high and stable, the TLB unit 70 receives no clocking pulses referenced from lines 220 and 222. In this mode the TLB unit 70 is powered down and is conserving power.

It is appreciated that the present invention provides advantageous operation for power conservation within portable and laptop computer systems. Furthermore, since DOS operating systems and DOS applications do not support paging modes, power conservation within portable DOS machines is very useful. The present invention may be employed for power conservation purposes within a computer system 112 that operates the DOS operating system or operates DOS applications. The present invention may be advantageously implemented within a portable computer system 112 that operates DOS applications.

An alternative embodiment of the present invention is illustrated in FIG. 6. FIG. 6 illustrates the power management block diagram of the alternative embodiment of the present invention as well as block diagrams of units of the microprocessor architecture 101 as relevant to the operation of the power management features. The alternative embodiment of the present invention provides the added feature of detecting when instructions are to be processed by the microprocessor 101 that do not involve external memory access operations and detecting when instructions are to be processed by the microprocessor 101 that do involve external memory access operations. When it is detected that no instructions decoded by the instruction decoder 53 or within the instruction queue require external memory access operations, and assuming the paging bit over line 218 is enabled, an instruction paging disable signal will be generated by the instruction analyzer block 290 over line 275 which is fed to the disable circuit 200. This signal is also referred to as an instruction disable signal, or instruction signal.

It is appreciated that, according to the alternative embodiment of the present invention, if the enable paging bit is 218 is enabled (i.e., CR_bit31=1) then the status of the line 275 will be processed by block 200 to effect the disable status of the PD signal at line 230. However, if the enable paging bit is 218 is disabled (i.e., CR_bit31=0) then the status of line 275 will be ignored by block 200. In other words, assuming the TLB unit 70 is idle, if line 218 is high and line 275 is high (asserted) then the paging disable signal over line 230 will go high. Assuming the TLB unit 70 is idle, if line 218 is high and line 275 is low the page disable signal over line 230 will be low. As before, whenever the TLB unit 70 is busy (i.e., line 216 is low) the paging disable signal 230 will always be low. Furthermore, according to the alternative embodiment of the present invention, whenever the paging enable signal (CR_bit31) of line 218 is low, the paging disable signal 230 will always be high, assuming the TLB unit 70 is idle. These states are summarized according to Table I below. It is appreciated that the alternative embodiment of the present invention offers additional advanced power savings during modes when paging is enabled (i.e., CR_bit31=1) but the TLB unit 70 is nevertheless not required because the currently executed and decoded instructions require no external memory access.

TABLE I

| Paging Enable Line 218 | Ins. Disable Line 275 | Busy# Line 216 | Page Disable Line 230 |
| --- | --- | --- | --- |
| 0 | n/a | 0 | 0 |
| 0 | n/a | 1 | 1 |
| 1 | 0 | n/a | 0 |
| 1 | 1 | 0 | 0 |
| 1 | 1 | 1 | 1 |

As shown by Table I, when paging is not enabled according to the control register paging signal, CR_bit31 over line 218, the page disable line 230 will be asserted unless the busy# is low. This would be the case if paging was enabled then programmed to be disabled while the TLB unit 70 was finishing a prior and valid address translation. When paging is disabled (line 218=0) and the busy# signal is high, the paging disable signal over line 230 is asserted high. It is appreciated that when the paging enable bit (line 218) is low, the status of the instruction disable line 275 is not required because the TLB unit 70 will be powered down regardless. Also, when paging is enabled (line 218=1) but the instruction disable line 275 is not asserted, then an instruction within the instruction decoder 53 or within the instruction queue requires an external memory access operation. During these modes, regardless of the status of the busy#, the paging disable line 230 will be low. The present invention adds the advanced power feature of powering down the TLB unit 70 by gating the clock supply lines when paging is enabled but yet the TLB unit 70 is not required. As Table I illustrates, when paging is enabled (line 218=1), and the instruction disable line 275 is asserted (line 275=1), then the page disable line 230 will become asserted when the TLB unit 70 is idle. Once the instruction disable line 275 is deasserted (line 275=0), the paging disable line 230 will be low. It is appreciated that the logic implemented according to the data of Table I is realized within the disable circuit 200 of this alternative embodiment of the present invention. The specific logic gates utilized to realize such table would be apparent to one of skill in the art of logic or digital design.

Referring to FIG. 6, the instruction analyzer 290 of the present invention monitors signal lines 270 from the instruction decoder 53. These signal lines 270 comprise a signal interface and are fed from the instruction decoder 53 and are active when the instruction decoder detects an instruction that requires an external memory access operation. This instruction decoder 53 generates these signals to indicate to other functional units within the microprocessor that an external memory operation will be required. Those functional units that are involved in the external memory access operation need advance warning to prepare for such an operation (for efficiency) and therefore monitor these well known signals and prepare accordingly. For example, the bus interface unit 51 and the segmentation unit 63 receive signals from line 270. Therefore, when an instruction within the instruction queue, or an instruction currently decoded by the decoder unit 53 requires an external memory access operation, the instruction analyzer 290 generates an asserted instruction signal over line 275 which is coupled to the disable circuit block 200. The signals asserted over line 270 are present typically one instruction cycle before the TLB unit 70 will be required for memory address translation. Therefore, the clock driver circuit has enough time to supply clock signals to the TLB unit 70 if such was powered down previously. According to this embodiment of the present invention, when lines 270 indicate that an external memory access operation is going to be required, line 275 is held high. When lines 270 indicate that an external memory access operation is not going to be required by the instructions processed by the instruction decoder 53, line 275 is held low.

It is appreciated that to the extent the above discussed alternative embodiment of the present invention was not distinguished from the preferred embodiment of the present invention, the embodiments are analogous and utilize the same circuitry and operational techniques.

Another, second alternative, embodiment of the present invention is presented wherein the instruction analyzer 290 analyzes fields of the instruction opcodes stored in the instruction decoder 53 to determine which instructions require external memory access operations and which do not. In this embodiment, also illustrated in FIG. 6, the instruction analyzer 290 receives or reads aligned instruction opcode fields via lines 270 representative of the instructions of the instruction decoder 53. The instruction decoder aligns the instruction opcode fields within the instruction queue according to known instruction field locations. The instruction decoder 53 aligns instruction opcodes so that all instruction fields are aligned in known places. Those instruction fields that indicate the need for external memory operations will be placed in known areas within the instruction decoder 53. Therefore, the instruction fields of those groups of instructions that involve an external memory access cycle will be aligned by the instruction decoder in particular known areas that can be examined by the instruction analyzer 290. These aligned instruction fields will indicate whether or not an external memory access operation is required according to the bit patterns of these aligned fields.

The instruction analyzer 290 will then analyze the location within the instruction decoder where external memory access operation information is placed for each instruction. The instruction analyzer 290 will compare the aligned instruction fields of the instructions within the instruction decoder 53 against a set of known instruction fields stored in a table of the analyzer 290 that may require external memory access operations (such as memory reads, data transfers, and jump instructions). When an instruction field requiring an external memory access operation is detected by the analyzer 290 within any of the instructions of the instruction decoder 53, the instruction disable line 275 carries a high signal. If such an instruction field is not detected within any of the instructions of the instruction decoder 53, the instruction disable line 275 will be asserted low. The instruction analyzer 290 performs the instruction field comparison operations and generates the status of line 275 at least one clock cycle before the instruction cycle in which the TLB unit 70 is required.

It is noted that not every instruction requiring an external memory access operation will necessarily require the TLB unit 70. Some instructions that require external memory address generation may not require the TLB 70. However, it is true that all instructions that require the use of the TLB unit 70 will necessarily involve an external memory access operation. Therefore, the present invention implements power savings (by powering down the TLB unit 70) based on external memory access generation in order to provide a unit without overly complex circuitry and in order to provide a unit that powers up the TLB unit 70 for every instruction that may require address translation operations.

To the extent the above discussed second alternative embodiment of the present invention was not distinguished from the preferred embodiment of the present invention, the embodiments are analogous and utilize the same circuitry and operation techniques. It is also appreciated that there are a number of techniques available for detecting instructions that require external memory access operations of the instruction decoder unit 53. The present invention illustrates particular embodiments of such applications. It is appreciated that other similar and equivalent methods of detecting an instruction having an external memory access operation would be within the scope of the present invention.

By performing the above operations, the alternative embodiments of the present invention allow power savings by powering down the TLB unit 70 during periods when paging is enabled (i.e., CR_bit31=1) but yet no instructions will need to use the results of the TLB unit 70 because they do not involve external memory access operations. And, if the TLB unit 70 needs to be used by an instruction from the instruction decoder 53, the TLB unit 70 will be powered up in time to provide the required functionality.

The preferred embodiment of the present invention, a system for conserving power in an electronic device by selectively disabling clocking signals to a Translation Lookaside Buffer unit when paging mode is disabled or during temporary periods of time when paging is enabled yet it is detected that the Translation Lookaside Buffer unit will not be utilized by the microprocessor, is thus described. While the present invention has been described in particular embodiments, it should be appreciated that the present invention should not be construed as limited by such embodiments, but rather construed according to the below claims.

What is claimed is:

1. An apparatus for selectively enabling and disabling clock signals to a translation lookaside buffer (TLB) so that power is conserved, said apparatus comprising:

means for generating a disable signal, said means for generating synchronized to transitions of said clock signals, said disable signal being active when:

a) said TLB is not performing an address translation and a paging mode is not enabled; or b) said TLB is not performing an address translation a paging mode is enabled, and an instruction signal is active;

means for generating a paging mode signal coupled to said means for generating a disable signal, said paging mode signal indicating when paging mode is enabled within a microprocessor means, and being provided to said means for generating a disable signal;

means for generating an instruction signal coupled to said means for generating a disable signal, said instruction signal being active when no instructions within an instruction decoder of said microprocessor means require an external memory access operation;

means for supplying said clock signals to said TLB, said means for supplying clock signals coupled to said TLB; and means for reducing power consumption by selectively gating off said clock signals when said disable signal is generated and for gating on said clock signals when said disable signal is not generated.

2. An apparatus as described in claim 1 wherein said means for generating said paging mode signal comprises a programmable control register means of a microprocessor.

3. An apparatus as described in claim 2 wherein said means for generating an instruction signal comprises means for analyzing aligned instruction fields of said instructions of said instruction decoder to determine instructions that require an external memory access operation.

4. An apparatus as described in claim 1 wherein said means for generating a disable signal comprises latching means for latching a current disable status represented by said disable signal until a new disable status is received from said means for generating said paging mode signal or said means for generating said instruction signal.

5. An apparatus for selectively enabling and disabling clock signals to a translation lookaside buffer (TLB) so that power consumption is reduced, said apparatus comprising:

a disable signal circuit for generating a disable signal, said disable signal being generated when:

a) said TLB is not performing an address translation and a paging mode is not enabled; or b) said TLB is not performing an address translation a paging mode is enabled, and an instruction is active;

a paging mode signal circuit coupled to said disable signal circuit, said paging mode signal circuit generating a paging mode signal indicating whether paging mode is enabled within a microprocessor, and providing said paging mode signal to said disable signal circuit;

an instruction signal circuit coupled to said disable signal circuit, said instruction signal being active when no instructions within an instruction decoder of said microprocessor means require an external memory access operation; and a clock gating circuit for reducing power consumption of said TLB by selectively gating off said clock signals when said disable signal is generated and for gating on said clock signals when said disable signal is not generated.

6. An apparatus as described in claim 5 wherein said paging mode signal circuit comprises a programmable control register of a microprocessor.

7. An apparatus as described in claim 5 wherein said instruction signal circuit comprises an analyzing circuit for analyzing aligned instruction fields of said instructions of said instruction decoder to determine instructions that require an external memory access.

8. An apparatus as described in claim 5 wherein said disable signal circuit comprises a latch apparatus for latching a current disable status represented by said disable signal for a period until a new disable status is received from said paging mode signal circuit or said instruction signal circuit.

9. An apparatus for power conservation within a microprocessor, said apparatus comprising:

a translation lookaside buffer (TLB) unit for use in translating a linear address to a physical address;

means for generating a disable signal when:

a) said TLB is not performing an address translation and a paging mode is not enabled; or b) said TLB is not performing an address translation, a paging mode is enabled, and an instruction signal is active;

means, coupled to said means for generating a disable signal, for generating a paging mode signal indicating whether said paging mode is enabled within a microprocessor means, and for providing said paging mode signal to said means for generating said disable signal;

means coupled to said means for generating a disable signal for generating said instruction signal indicating that no instructions within an instruction decoder of said microprocessor means require an external memory access; and means for reducing power consumption of said TLB unit by selectively gating off said clock signals when said disable signal is generated and for gating on said clock signals when said disable signal is not generated.

10. An apparatus for power conservation as described in claim 9 wherein said means for generating said paging mode signal comprises a programmable control register means of said microprocessor means.

11. An apparatus for power conservation as described in claim 9 wherein:

said means for generating said disable signal comprises latching means for latching a current disable status represented by said disable signal for a period until a new disable status is received from said means for generating said paging mode signal or said means for generating an instruction signal; and said means for generating said instruction signal comprises means for analyzing aligned instruction fields of said instructions of said instruction decoder to determine instructions that require an external memory access.

12. An apparatus for power conservation within a microprocessor, said apparatus comprising:

a translation lookaside buffer (TLB) unit for use in translating linear addresses to physical addresses;

disable logic synchronized to clock signals to said TLB for generating a disable signal when:
said TLB is not performing an address translation and a paging mode is not enabled, or
said TLB is not performing an address translation, a paging mode is enabled and an instruction signal is active;

a programmable control register comprising an indicator for indicating whether said paging mode is enabled within a microprocessor, said programmable control register being coupled to said disable logic so as to allow said disable logic to monitor said indicator;

instruction analyzing logic coupled to said disable logic for generating said instruction signal indicating that no instructions within an instruction decoder of said microprocessor require an external memory access; and gating logic for reducing power consumption of said TLB unit by selectively gating off said clock signals when said disable signal is generated and for gating on said clock signals when said disable signal is not generated.

13. An apparatus for power conservation as described in claim 12 wherein said disable logic comprises a latch network for latching a current disable status represented by said disable signal for a period until a new disable status is received from said programmable control register or said instruction analyzing logic.

14. A computer system having power conservation features, said power conservation features provided within a microprocessor, said system comprising:

bus means for coupling system components, memory storage means coupled to said bus means for storing system information, data input means coupled to said bus means for receiving system information, communication means coupled to said bus means for sending system information, and microprocessor means coupled to said bus means for processing information, said microprocessor means further comprising:

(a) a translation lookaside buffer (TLB) unit for use in translating a linear address to a physical address;

(b) means for generating a paging mode signal indicating whether paging mode is enabled within said microprocessor means;

c) means for generating an instruction signal indicating that no instructions within an instruction decoder of said microprocessor means require an external memory access:

(d) means for generating a disable signal coupled to said means for generating a paging mode signal, so as to receive said paging mode signal, and to said means for generating an instruction signal, said disable signal being generated when:
said TLB is not performing an address translation and said paging mode is not enabled, or
said TLB is not performing an address translation, said paging mode is enabled and said instruction signal is active; and e) means for reducing power consumption of said TLB unit by selectively gating off said clock signals when said disable signal is not generated.

15. A computer system having power conservation features as described in claim 14 wherein said means for generating said paging mode signal comprises a programmable control register means.

16. A computer system having power conservation features as described in claim 15 wherein said means for generating an instruction signal comprises means for analyzing aligned instruction fields of said instructions of said instruction decoder to determine instructions that require an external memory access.

17. A computer system having power conservation features as described in claim 14 wherein said means for generating a disable signal comprises latching means for latching a current disable status represented by said disable signal for a period until a new disable status is received from said means for generating said paging mode signal or said means for generating an instruction signal.

18. A method of power conservation within a microprocessor, said method comprising the steps of:

monitoring whether paging mode is enabled or disabled within said microprocessor, and whether a translation lookaside buffer (TLB) of said microprocessor is performing an address translation;

generating a disable signal when said paging mode is not enabled and said translation lookaside buffer (TLB) of said microprocessor is not performing an address translation, said step of generating a disable signal comprising the step of synchronizing said disable signal to transitions of clock signals to said TLB; and reducing power consumption by selectively gating off said clock signals when said disable signal is generated; and gating on said clock signals when said disable signal is not generated.

19. A method of power conservation as described in claim 18 wherein said step of monitoring whether paging mode is enabled comprises the step of detecting whether a bit of programmable control register within said microprocessor is high or low.

20. A method of power conservation within a microprocessor, said method comprising the steps of:

monitoring whether paging mode is enabled or disabled within said microprocessor, and whether a translation lookaside buffer (TLB) of said microprocessor is performing an address translation;

generating an instruction signal indicating that no instructions within an instruction decoder of said microprocessor require an external memory access;

generating a disable signal when said TLB is not performing an address translation and when said paging mode is not enabled or when said paging mode is enabled and said instruction signal is generated;

reducing power consumption by selectively gating off clock signals that supply said TLB when said disable signal is generated; and selectively gating on said clock signals when said disable signal is not generated.

21. A method of power conservation as described in claim 20 wherein:

said step of generating a disable signal comprises the step of latching a current disable status represented by said disable signal for a period until a new disable status is received as a result of said step of monitoring whether paging mode is enabled or said step of generating an instruction signal; and said step of generating an instruction signal comprises the step of analyzing aligned instruction fields of said instructions of said instruction decoder to determine instructions that require an external memory access.

* * * * *